US012626072B2

(12) United States Patent
Krause et al.

(10) Patent No.: US 12,626,072 B2
(45) Date of Patent: May 12, 2026

(54) MULTILINGUAL GRAMMATICAL ERROR CORRECTION

(71) Applicant: Google LLC, Mountain View, CA (US)

(72) Inventors: Sebastian Krause, Zurich (CH); Sascha Rothe, Zurich (CH); Jonathan Mallinson, Zurich (CH); Eric Malmi, Zurich (CH); Aliaksei Severyn, Zurich (CH)

(73) Assignee: Google LLC, Mountain View, CA (US)

( * ) Notice: Subject to any disclaimer, the term of this patent is extended or adjusted under 35 U.S.C. 154(b) by 453 days.

(21) Appl. No.: 17/304,202

(22) Filed: Jun. 16, 2021

(65) Prior Publication Data

US 2022/0405490 A1 Dec. 22, 2022

(51) Int. Cl.
*G06F 40/58* (2020.01)
*G06F 40/253* (2020.01)

(52) U.S. Cl.
CPC ............ *G06F 40/58* (2020.01); *G06F 40/253* (2020.01)

(58) Field of Classification Search
CPC ...... G06F 40/58; G06F 40/253; G06F 40/232; G06N 3/08; G06N 3/09
See application file for complete search history.

(56) References Cited

U.S. PATENT DOCUMENTS

| | | | | |
|---|---|---|---|---|
| 5,535,121 | A * | 7/1996 | Roche | G06F 40/253 704/9 |
| 11,361,170 | B1 * | 6/2022 | Shastry | G06N 3/047 |
| 2021/0271810 | A1 * | 9/2021 | Nadejde | G06N 3/045 |
| 2022/0019737 | A1 * | 1/2022 | Choi | G06N 20/00 |

FOREIGN PATENT DOCUMENTS

| | | |
|---|---|---|
| JP | 2019-16140 A | 1/2019 |
| JP | 2019-197336 A | 11/2019 |

OTHER PUBLICATIONS

Wang Q, Tan Y. Grammatical error detection with self attention by pairwise training. In 2020 International Joint Conference on Neural Networks (IJCNN) Jul. 19, 2020 (pp. 1-7). IEEE. (Year: 2020).*
Yamashita I, Katsumata S, Kaneko M, Imankulova A, Komachi M. Cross-lingual transfer learning for grammatical error correction. In Proceedings of the 28th International Conference on Computational Linguistics Dec. 2020 (pp. 4704-4715). (Year: 2020).*

(Continued)

*Primary Examiner* — Linda Wong
(74) *Attorney, Agent, or Firm* — Honigman LLP; Brett A. Krueger; Grant Griffith

(57) ABSTRACT

A method of training a text-generating model for grammatical error correction (GEC) includes obtaining a multilingual set of text samples where each text sample includes a monolingual textual representation of a respective sentence. The operations also include, for each text sample of the multilingual set of text samples, generating a corrupted synthetic version of the respective text sample where the corrupted synthetic version of the respective text sample includes a grammatical change to the monolingual textual representation of the respective sentence associated with the respective text sample. The operations further include training the text-generating model using a training set of sample pairs. Each sample pair in the training set of sample pairs includes one of the respective text samples of the multilingual set of text samples and the corresponding corrupted synthetic version of the one of the respective text samples of the multilingual set of text samples.

20 Claims, 7 Drawing Sheets

(56) References Cited

OTHER PUBLICATIONS

Yang L, Wang C, Chen Y, Du Y, Yang E. Controllable Data Synthesis Method for Grammatical Error Correction. arXiv preprint arXiv:1909.13302. Sep. 29, 2019. (Year: 2019).* https://www.comp.nus.edu.sg/~nlp/corpora.html (Year: 2013).*

Náplava J, Straka M. Grammatical error correction in low-resource scenarios. arXiv preprint arXiv:1910.00353. Oct. 1, 2019. (Year: 2019).*

Chan et al, Grammatical Error Correction for Code-Switched Sentences by Learners of English, Apr. 18, 2024, https://arxiv.org/abs/2404.12489v1 (Year: 2024).*

International Search Report and Written Opinion for the related Application No. PCT/US2022/072965, dated Sep. 2, 2022, 67 pages.

Yamashita Ikumi et al: "Cross-lingual Transfer Learning for Grammatical Error Correction", Proceedings of the 28th International Conference on Computational Linguistics, Dec. 13, 2020 (Dec. 13, 2020), pp. 4704-4715, XP055954222, Stroudsburg, PA, USA DOI: 10.18653/v1/2020.coling-main.415 Retrieved from the Internet: <URL: https://aclanthology.org/2020.coling-main.415.pdf>, 12 pages.

Satoru Katsumata et al: "Stronger Baselines for Grammatical Error Correction Using Pretrained Encoder-Decoder Model", arxiv.org, Cornell University Library, 201 Olin Library Cornell University Ithaca, NY 14853, May 25, 2020 (May 25, 2020), XP081682884, 6 pages.

Felix Stahlberg et al: "Synthetic Data Generation for Grammatical Error Correction with Tagged Corruption Models", arx:cv.org, Cornell University Library, 201 Olin Library Cornell University Ithaca, NY, 14853, May 27, 2021 (May 27, 2021), XP081970784, 14 pages.

Elizaveta Korotkova et al: "Grammatical Error Correction and Style Transfer via Zero-shot Monolingual Translation", arxiv.org, Cornell University Library, 201 Olin Library Cornell University Ithaca, NY 14853, Mar. 27, 2019 (Mar. 27, 2019), XP081158577, 11 pages.

Wangchunshu Zhou et al: "Improving Grammatical Error Correction with Machine Translation Pairs", arxiv.org, Cornell University Library, 201 Olin Library Cornell University Ithaca, NY 14853, Nov. 7, 2019 (Nov. 7, 2019), XP081528260, 9 pages.

Office Action issued in related Japanese Patent Application No. 2023-577753, dated Apr. 8, 2025.

* cited by examiner

Figure 4:
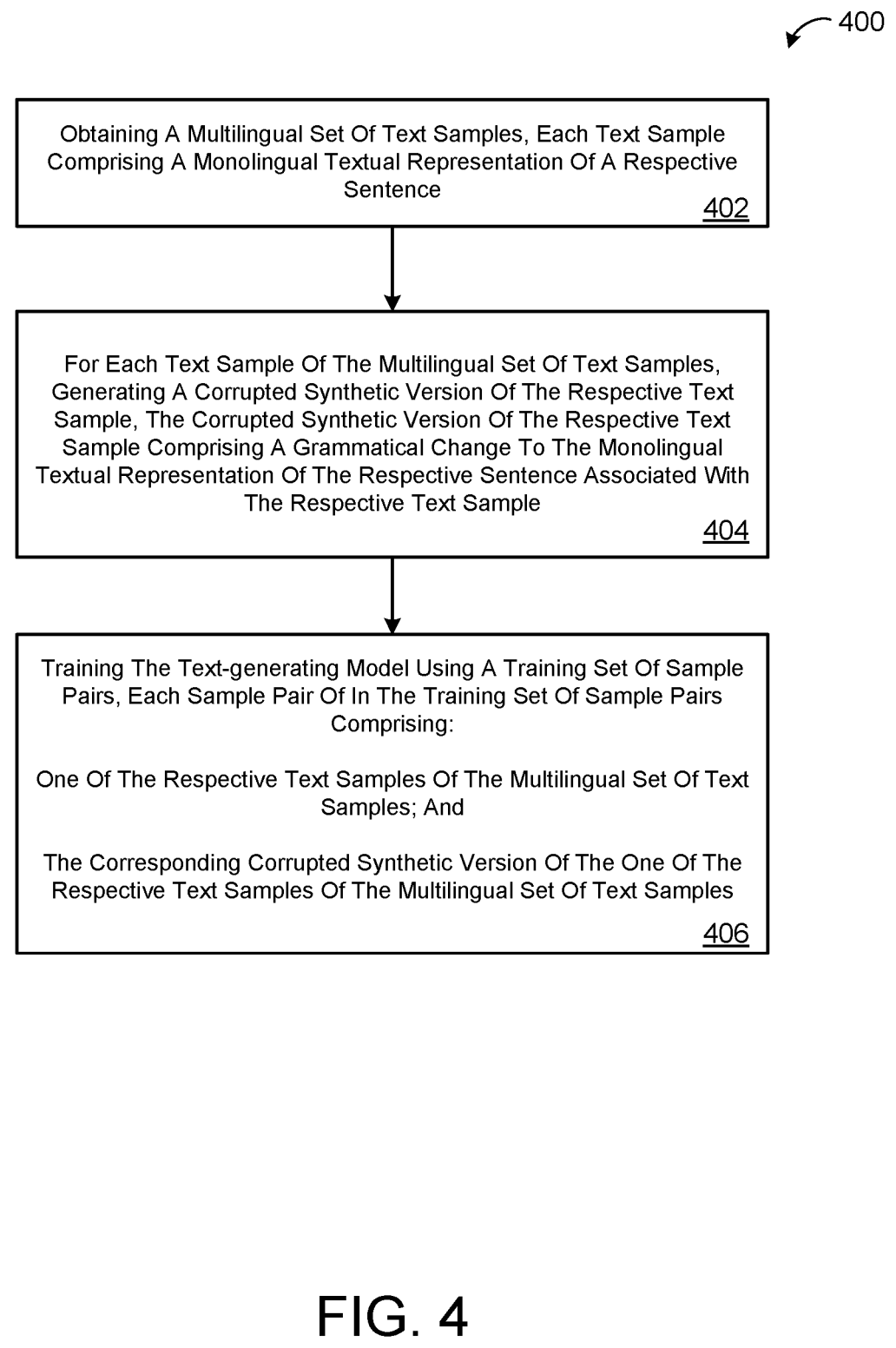

400

Obtaining A Multilingual Set Of Text Samples, Each Text Sample Comprising A Monolingual Textual Representation Of A Respective Sentence

402

For Each Text Sample Of The Multilingual Set Of Text Samples, Generating A Corrupted Synthetic Version Of The Respective Text Sample, The Corrupted Synthetic Version Of The Respective Text Sample Comprising A Grammatical Change To The Monolingual Textual Representation Of The Respective Sentence Associated With The Respective Text Sample

404

Training The Text-generating Model Using A Training Set Of Sample Pairs, Each Sample Pair Of In The Training Set Of Sample Pairs Comprising:

One Of The Respective Text Samples Of The Multilingual Set Of Text Samples; And

The Corresponding Corrupted Synthetic Version Of The One Of The Respective Text Samples Of The Multilingual Set Of Text Samples

MULTILINGUAL GRAMMATICAL ERROR CORRECTION

TECHNICAL FIELD

This disclosure relates to multilingual grammatical error correction.

BACKGROUND

As user-generated text continues to play a significant role in human-computer interaction and human-to-human interaction using a computing device, the ability of a Natural Language Generation (NLG) system to ensure that the user-generated text is grammatically accurate can be an important aspect of communication. For instance, grammatically accurate text enables readability and may prevent potential miscommunication or misunderstanding. That is, grammatical errors may change the meaning of a communication or lead to some degree of confusion as to the meaning of the text. Although conventional grammatical error correction techniques attempt to address grammar problems in text, such techniques often suffer from issues with training data (e.g., scarcity of training data, label accuracy of training data, and/or a lack of bias in error distributions for training data), causing grammatical error correction models to be limited in their capabilities.

SUMMARY

One aspect of the disclosure provides a computer-implemented method of training a text-generating model for grammatical error correction (GEC). The method when executed by data processing hardware causes the data processing hardware to perform operations. The operations include obtaining a multilingual set of text samples where each text sample includes a monolingual textual representation of a respective sentence. The operations also include, for each text sample of the multilingual set of text samples, generating a corrupted synthetic version of the respective text sample where the corrupted synthetic version of the respective text sample includes a grammatical change to the monolingual textual representation of the respective sentence associated with the respective text sample. The operations further include training the text-generating model using a training set of sample pairs. Each sample pair in the training set of sample pairs includes one of the respective text samples of the multilingual set of text samples and the corresponding corrupted synthetic version of the one of the respective text samples of the multilingual set of text samples.

Another aspect of the disclosure provides a system of training a text-generating model for grammatical error correction (GEC). The system includes data processing hardware and memory hardware in communication with the data processing hardware. The memory hardware storing instructions that when executed on the data processing hardware cause the data processing hardware to perform operations. The operations include obtaining a multilingual set of text samples where each text sample includes a monolingual textual representation of a respective sentence. The operations also include, for each text sample of the multilingual set of text samples, generating a corrupted synthetic version of the respective text sample where the corrupted synthetic version of the respective text sample includes a grammatical change to the monolingual textual representation of the respective sentence associated with the respective text sample. The operations further include training the text-generating model using a training set of sample pairs. Each sample pair in the training set of sample pairs includes one of the respective text samples of the multilingual set of text samples and the corresponding corrupted synthetic version of the one of the respective text samples of the multilingual set of text samples.

Implementations of the method or the system of the disclosure may include one or more of the following optional features. In some implementations, the operations further include, after training the text-generating model, fine-tuning the trained text-generating model using supervised training data where the supervised training data includes non-synthetic text pairs with each non-synthetic text pair including an ungrammatical text sample and a grammatical text version of the ungrammatical text sample. In some examples, generating the corrupted synthetic version of the respective text sample includes removing more than one characters from the respective sentence associated with the respective text sample. In some configurations, generating the corrupted synthetic version of the respective text sample includes replacing a first set of characters from the respective sentence associated with the respective text sample with a second set of characters different from the first set of characters. In some implementations, generating the corrupted synthetic version of the respective text sample includes inserting one or more characters into the respective sentence associated with the respective text sample. Optionally, generating the corrupted synthetic version of the respective text sample includes changing a character-case for a character of a word of the respective sentence associated with the respective text sample. The text-generating model may include a transformer encoder-decoder architecture. The operation may further include pre-training the text-generating model with a multilingual training corpus based on a masked-language objective.

These implementations of the method or the system of the disclosure may also include generating the corrupted synthetic version of the respective text sample by randomly applying a corruption operation to the respective sentence associated with the respective text sample, wherein each corrupted synthetic version is unique with respect to the other corrupted synthetic versions of the text samples. The corruption operations may include at least one of: removing more than one characters from the respective sentence associated with the respective text sample; replacing a first set of characters from the respective sentence associated with the respective text sample with a second set of characters different from the first set of characters; inserting one or more characters into the respective sentence associated with the respective text sample; or changing a character-case of a word of the respective sentence associated with the respective text sample. The operations of the disclosure may also include using the trained text-generating model for GEC during inference by (i) receiving, as input to the trained text-generating model, a first input text in a first language that includes grammatical errors and generating, as output from the trained text-generating model, a first output text in the first language that corrects the grammatical errors and (ii) receiving, as input to the trained text-generating model, a second input text in a different second language that includes grammatical errors and generating, as output from the trained text-generating model, a second output text in the second language that corrects the grammatical errors.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 4 is a flow chart of an example arrangement of operations for a method of training a text-generating model for grammatical error correction.

Like reference symbols in the various drawings indicate like elements.

DETAILED DESCRIPTION

Figure 1:
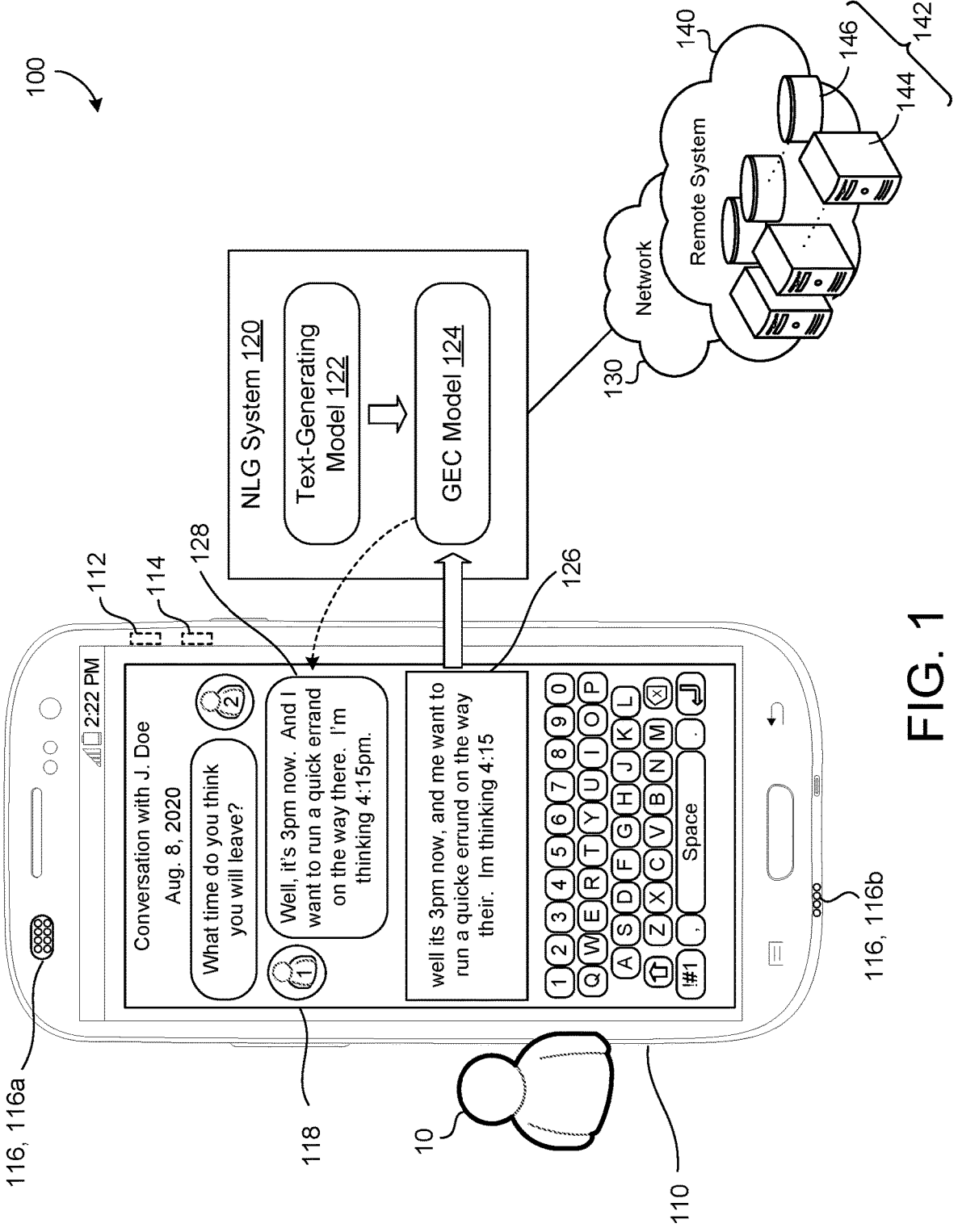
FIG. 1 is a schematic view of an example text-correcting environment using a grammatical error correction model.

Natural language processing (NLP) generally refers to understanding natural human language using computing technology. NLP enables user devices or computing devices to automatically handle forms of natural human language such as speech or text. One more specific type of natural language processing is what is referred to as Natural Language Generation (NLG). NLG broadly concerns the process of generating a textual representation (i.e., text) of human language. NLG may include a wide array of text generation tasks, such as grammatical error correction (GEC). As text becomes increasingly prevalent in the use of computing devices, there has been a greater demand for GEC, which refers to the task of correcting grammatical errors or other text-related errors. For instance, in an age where the text message has become more widely used than the phone call, GEC may improve the readability of user-generated texts. Furthermore, improvements to GEC may also assist people who face grammar challenges, such as non-native speakers, children, or individuals with some type of impairment.

Conventionally, the task of GEC has been viewed as monolingual text-to-text rewriting. To perform text-to-text rewriting, text generation models often will employ neural network architectures. These neural network architectures typically demand training data sets that are rather large. Yet needing a fairly large training data set can be problematic across multiple languages. For instance, large amounts of training data exist for prevalent languages such as English or Japanese, but other languages suffer from training data scarcity. Meaning that, languages that are less prevalent tend to have an inadequate amount of training data to train a neural network text generation model capable of performing GEC. Therefore, although there are training data sets that include multiple languages, even these training data sets tend to be very skewed such that the distribution of training samples in these data sets favors more prevalent languages and underrepresents other languages. For example, one popular training corpus includes over eighty languages, but only ten of these languages include more than ten thousand training samples (e.g., ten thousand ungrammatical-grammatical sample pairs). To place this in perspective, this popular training corpus's most prevalent languages like English and Japanese have over a million training sample pairs. With this inherent language bias, any text generation model trained for GEC using this training data will likely perform sub-optimally for many languages (e.g., the non-prevalent languages).

Due to limited amounts of suitable training data to perform GEC, there has been an effort to supplement or use synthetic training data. Synthetic data refers to data that is machine-generated (e.g., from a machine model) rather than human-generated. Unfortunately, a model taught by synthetic training data is not without its setbacks. For example, although fine-tuning a model for the task of GEC has been shown to improve GEC accuracy, it often requires language-specific tuning (e.g., with language-specific hyper parameters and spelling dictionaries) and/or has difficulty representing a complete error distribution for training evaluation sets. These challenges typically cause a final model for GEC to undergo a multi-stage fine-tuning process demanding particular learning rates and training steps at each fine-tuning stage.

To address some of these issues with teaching a model to perform GEC, implementations herein are directed toward a pre-training approach that applies a fully unsupervised language-agnostic pre-training objective that mimics corrections typically contained in labeled data. The pre-training approach is unsupervised in that the training data used for pre-training comes from grammatically correct text samples (e.g., a grammatically correct sentence) that have been paired with synthetic ungrammatical text versions of themselves. Meaning that a training sample pair for the pre-training process includes a grammatically correct text sample with a version of itself that has been automatically corrupted (i.e., grammatically changed to be ungrammatical by a corruption operation). Here, since a machine generates this corrupted version, the corrupted version is synthetic and not human-made. For context, conventionally, it is the case that an ungrammatical text sample is paired with a label that is the grammatical version of the ungrammatical text sample. By instead synthetically corrupting a sample of text that was originally grammatically correct, the training sample pair does not need an explicit label (e.g., a label identifying a grammatical correction).

The process of generating a synthetic training text sample for a training sample pair based on a grammatically correct text sample is also language-agnostic. Here, the objective is language-agnostic because the corruption techniques are not language specific. That is, the techniques modify each grammatically correct text sample without any focus on the underlying language of the grammatically correct text sample. For instance, changing a sequence of characters or tokens in a grammatically correct sample does not introduce any bias towards a particular language. Additionally, this technique also aims to avoid bias to any particular type of grammatical error that, in some respect, may be particular to a certain language. For example, if a corruption operation changed the "e" before "i," which is a common grammatical error in English, the model performing GEC may become inherently biased to learn to identify English grammatical errors rather multi-lingual errors more broadly. By using corruption operations and techniques that are not unique to a particular language, the corruption process may avoid teaching a text-generating model some form of language correction bias. Moreover, unlike previous approaches, which may generate synthetic training data, the synthetic pre-training process remains fully language-agnostic by training a single model on all languages within the training data set without employing language-specific priors.

In some examples, after pre-training a text-generation model for GEC, the text-generation model is considered a GEC model. Here, the GEC model may undergo a fine-tuning process prior to inference. In this fine-tuning process, the GEC model receives supervised GEC training data. In some implementations, the GEC training data is language specific. In other implementations, the GEC training data corresponds to non-synthetic or human-made text samples that are available with appropriate labels. That is, the GEC training data is human-made text samples where each training example is an ungrammatical-grammatical sample pair.

FIG. 1 is an example of a text-correcting environment 100. In the text-correcting environment 100, a user 10 operates a user device 110 to have a text conversation with another person. For example, FIG. 1 depicts the user device 110 as a mobile phone where the user 10 types the text into a keyboard (e.g., a touch input keyboard). The user device 110 (also referred to generally as a device 110) may correspond to any computing device associated with a user 10 and capable of generating text 126. Some examples of user devices 110 include, but are not limited to, mobile devices (e.g., mobile phones, tablets, laptops, etc.), computers, wearable devices (e.g., smart watches), smart appliances, internet of things (IoT) devices, smart speakers, etc. The user device 110 includes data processing hardware 112 and memory hardware 114 in communication with the data processing hardware 112 and storing instructions, that when executed by the data processing hardware 112, causes the data processing hardware 112 to perform one or more operations (e.g., operations related to text generation or text correction). The user device 110 may also include an audio subsystem 116 with an audio capture device (e.g., microphone) 116, 116a for capturing and converting spoken utterances within the speech-enabled system 100 into electrical signals and a speech output device (e.g., a speaker) 116, 116b for communicating an audible audio signal (e.g., as output audio data from the device 110). The user device 110 (e.g., using the hardware 112, 114) is further configured to perform grammatical error correction (GEC) on the text sequence 126 input by the user 10 using a GEC model 124 of a NLG system 120.

The NLG system 120 refers to a natural language generating system that is capable of processing text (e.g., the user-generated text 126) for various functions or tasks. Here, the NLG system 120 includes a text-generating model 122. The text-generating model 122 is a model with a flexible NLP framework that may be further trained on specific language tasks. In some examples, the text-generating model 122 is a model taught by transfer learning. For example, the text-generating model 122 is pre-trained on available unlabeled text data with a self-supervised task (i.e., a data-rich task). In some implementations, the text-generating model 122 is a transformer encoder-decoder model that may be further fine-tuned for many specific NLG tasks. More particularly, the text-generating model 122 may be a text-to-text transfer transformer (T5) with a unified framework that converts text-based language problems into a text-to-text format. By using a text-to-text framework, the text-generating model 122 along with its loss function, and hyper parameters may be compatible with many (if not all) NLP tasks, such as machine translation, document summarization, question answering, classification tasks, GEC tasks, etc. Furthermore, when the text-generating model 122 is pre-trained, the pre-training corpus may include multiple languages; allowing downstream task-specific versions of the text-generating model 122 to potentially be multilingual models as well. For instance, one common pre-training corpus includes over one hundred languages.

In some examples, the pre-training process for the text-generating model 122 is based on some version of a masked-language objective (e.g., a span prediction task). After pre-training the text-generating model 122, the text-generating model 122 is further trained (e.g., by the training process 200 and the fine-tuning process 300) to become capable of performing GEC. Here, when the text-generating model 122 has this GEC capability, the text-generating model 122 is then referred to as a GEC model 124. In other words, a GEC model 124 is a downstream version of the text-generating model 122 to perform the NLG task of grammatical error correction. That is, although the text-generating model 122 is a rather omnipotent model from a NLP task perspective, the text-generating model 122 is generally not accurate on specific NLG tasks like GEC until it undergoes further task-specific training. What this means is that the text-generating model 122 is first pre-trained to be an omnipotent NLP model and then trained (e.g., by the training process 200) to become a GEC model 124. The GEC model 124 as described in further detail below may then be further fine-tuned (e.g., by the fine-tuning process 300) for greater GEC accuracy even though it may perform GEC to some degree without this additional GEC fine-tuning.

In some implementations, the device 110 communicates via a network 130 with a remote system 140. The remote system 140 may include remote resources 142, such as remote data processing hardware 144 (e.g., remote servers or CPUs) and/or remote memory hardware 146 (e.g., remote databases or other storage hardware). The device 110 may utilize the remote resources 142 to perform various functionality related to text generation and/or GEC. For instance, some of the functionality of the NLG system 120 may reside on the remote system 140. In one example, the NLG system 120 may reside on the device 110 for performing on-device text generation (e.g., GEC). In another example, the NLG system 120 resides on the remote system to provide server-side GEC. In yet another example, functionality of the NLG system 120 is split across the device 110 and the server 140.

In some examples, such as FIG. 1, the user 10 interacts with a program or application 118 of the user device 110 that uses the NLG system 120 and, more particularly, the GEC model 124. Here, the application 118 corresponds to a communication application such as a short message service (SMS) application or a multimedia messaging service (MMS) application. The user 10 may explicitly invoke the application 118 (e.g., via a user input) to generate the text 126. For instance, FIG. 1 depicts the user 10, Ted, communicating (e.g., texting) with another user, Ted's friend named Jane. Here, the text message conversation between Ted 10 and Jane may be received/generated by the communication application 118 of the user device 110. In these examples, the communication application 118 uses the NLG system 120 with a text-generating model 122 that has been further trained to be a GEC model 124 for the specific task of GEC. Here, the user-generated text 126 is sent to the GEC model 124 (i.e., a text-generating model 122 trained for GEC), as input. In this example, the user-generated text 126 is in the English language and includes more than one grammatical error. The GEC model 124 receives the text 126 and generates a sequence of text (referred to as a grammatically correct text 128), as output (i.e., an output text sequence), that corrects grammatical errors included in the user-generated text 126. In the depicted example, the user 10 receives an initial text message from Jane that asks "what time do you think you will leave?" The user 10 responds to this question by typing the text 126 "well its 3 pm now, and I want to run a quick errund on the way their. Im thinking 4:15" Here, the text 126 by the user 10 fails to capitalize the first letter of the first word of the text 126 "well." The text 126 also misspells the words "quick" as "quicke" and "errand" as "errund." The text 126 shows the user improperly used "me" instead of "I" when referring to the first person. The text 126 misuses the possessive word "their" when the user 10 intended to type the adverb "there." The user 10 also mistakenly used the possessive "its" when the user 10 intended the conjunction "it's" and did not include the apostrophe in the conjunction "I'm." The GEC model 124 recognizes these grammatical errors with the text 126 and generates a corrected form 128 of the text 126 as output such that the grammatically corrected text 128 may be then sent as a text message to Jane. In this example, the output of the GEC model 124, the corrected text 128 states, "Well, it's 3 pm now. And I want to run a quick errand on the way there. I'm thinking 4:15 pm."

Although the depicted example shows the text 126 in English, the GEC model 124 may correct grammatical errors in multiple languages. To continue the example, this means that the user 10, Ted, may later have a text conversation in Spanish with his friend Steve where the same GEC model 124 corrects any Spanish grammatical errors present in text 126 input by Ted. In other words, the GEC model 124 may generate a first output text 128 to correct grammatical errors of a first text 126 in a first language and also generate a second output text 128 to correct grammatical errors of a second text 126 in a second language that is different from the first language. As a multilingual GEC model 124, the GEC model 124 may grammatically correct text errors in several languages (e.g., two languages, ten languages, eighty languages, or upwards of one hundred languages).

Figure 2A:
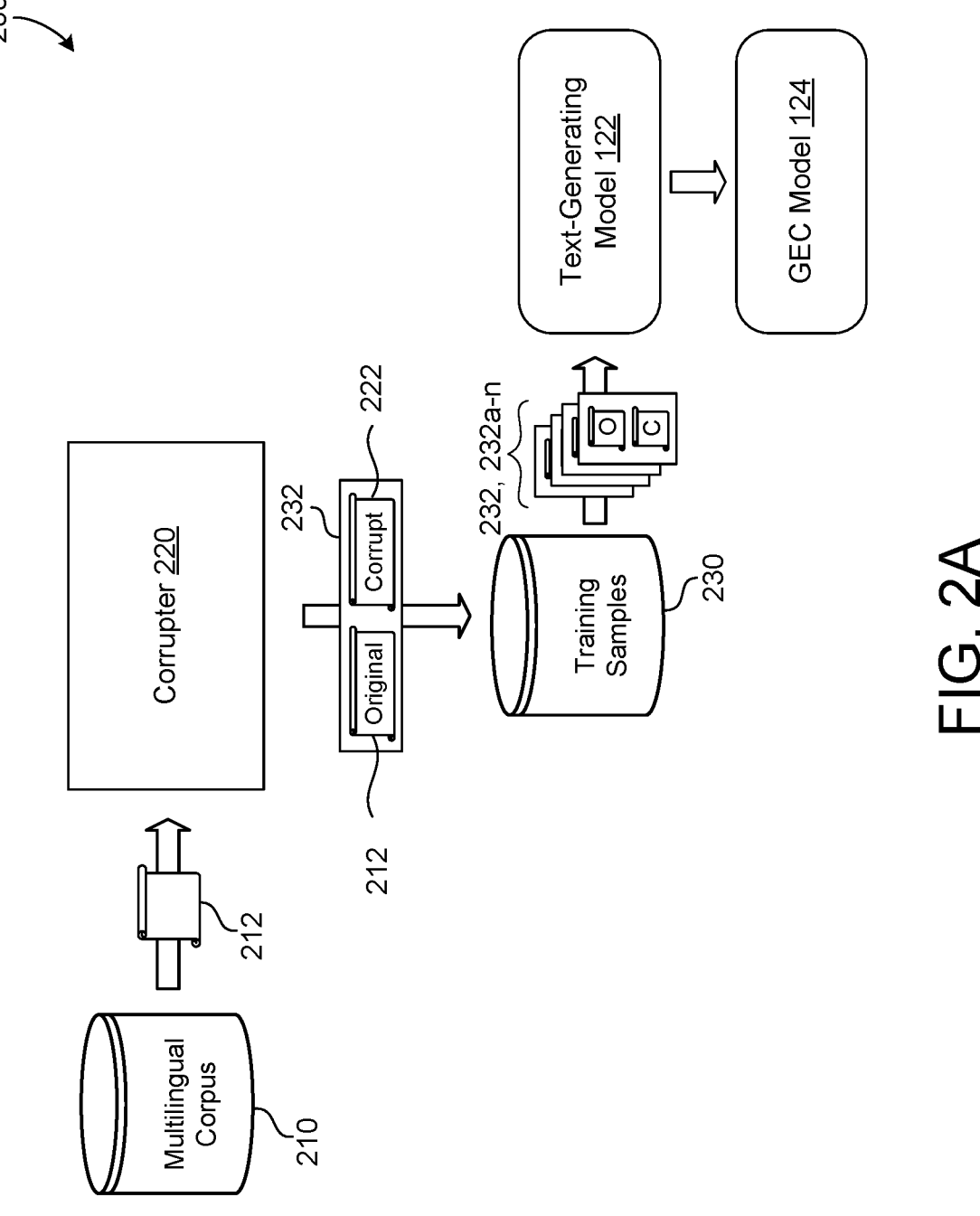
FIGS. 2A-2C are schematic views of a training process for the grammatical error correction model.
Figure 2B:
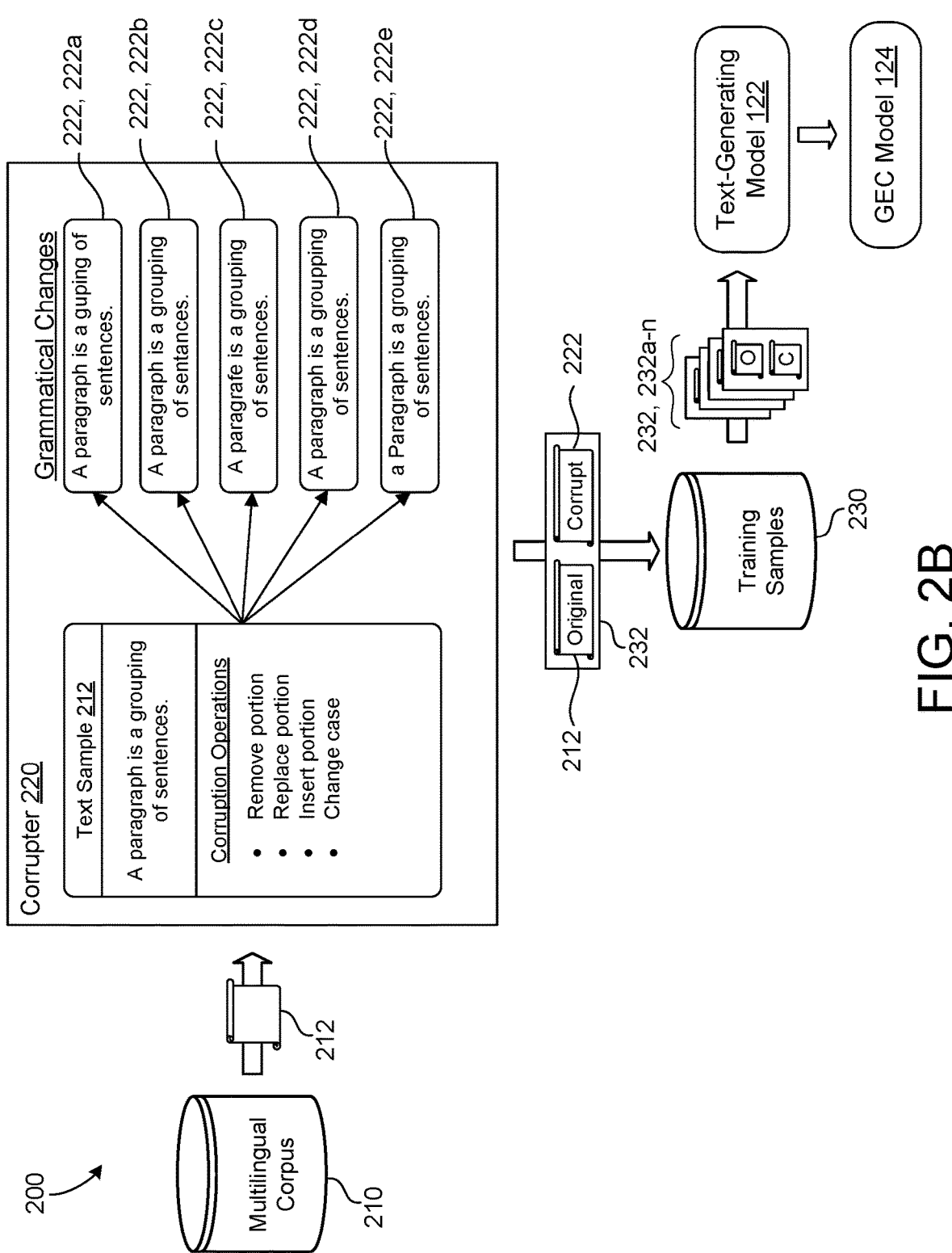
Figure 2C:
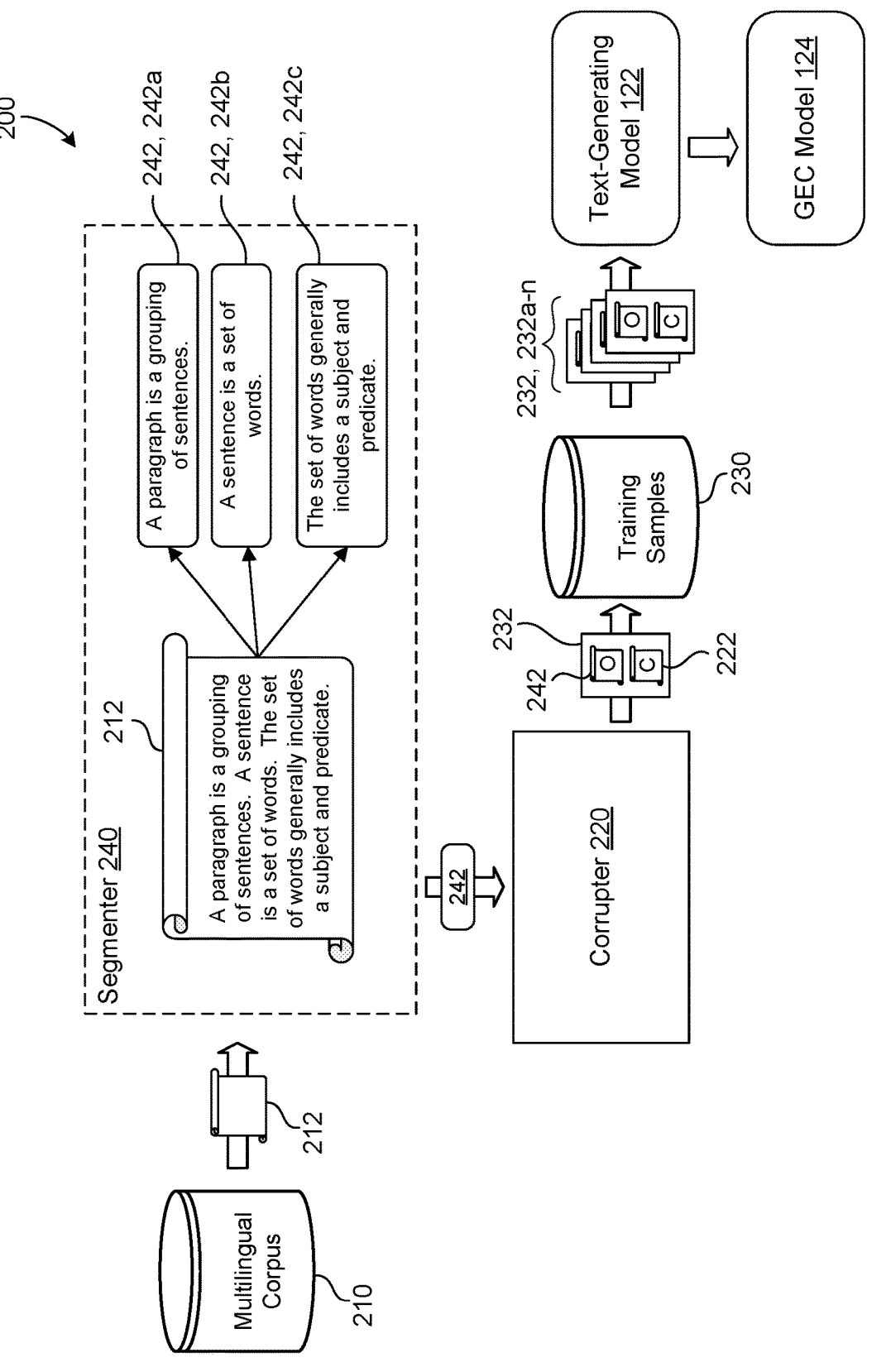

FIGS. 2A-2C illustrate a training process 200 for teaching the texting-generating model 122 to perform GEC. When the training process 200 teaches the text-generating model 122 to perform GEC, the text-generating model 122 then becomes the GEC model 124. In other words, the text-generating model 122 without specific GEC training is not able to perform the text-generating task of GEC. The training process 200 obtains a corpus 210 of text samples 212 that will be used to train the text-generating model 122 to perform GEC. The corpus 210 generally refers to any collection or multilingual set of text samples 212. The corpus 210 is a multilingual set of text samples 212 in that, although each individual text sample 212 is monolingual (e.g., a monolingual sentence), the corpus 210 includes text samples 212 from more than one language. For instance, the corpus 210 includes text samples 212 from tens of, or upwards of one hundred, different languages.

With the text samples 212, the training process 200 uses a corrupter 220 to generated corrupted synthetic versions 222 (also referred to as corrupted text samples 222 or corrupted text 222) of the text samples 212. That is, the corrupter 220 is configured to generate a machine-generated version of the text sample 212, which makes the corrupted text version 222 a synthetic text sample. Generally speaking, the text sample 212 that the corrupter 220 corrupts is a non-synthetic text sample that is obtained from human-generated text. In other words, the corrupter 220 functions to "corrupt" or introduce a grammatical error to the text sample 212. In this respect, the text sample 212 servers as a grammatically correct text sample that the corrupter 220 modifies grammatically to produce the corrupted synthetic version 222 of the text sample 212. For instance, the corrupter 220 corrupts the text sample 212 to form the corrupted synthetic text version 222 of the text sample 212 by making a grammatical change to the monolingual textual representation of the text sample 212. The training process 200 then pairs the text sample 212 with its corrupted synthetic text version 222 to form a training sample pair 232. That is, the text sample 212 and the corrupted synthetic version 222 form a grammatical-ungrammatical text sample pair 232. The training process 200 compiles the collection of training sample pairs 232 to be a training set 230 that will then be used to train the text-generating model 122 to perform GEC (i.e., to become the GEC model 124). When the training process 200 then trains the text-generating model 122 with the training set 230, the training process 200 may train the text-generating model 122 until convergence (i.e., when the model 122 outputs a corrected text 128 for GEC that converges with or matches the text sample 212 provided). In FIGS. 2A-2C, "original" or "O" designates the text sample 212 from the corpus 210 in the training sample pair 232 while the "corrupt" or "C" designates the corrupted synthetic text version 222 of the text sample 212 (generated by the corrupter 220) in the training sample pair 232.

Referring to FIG. 2B, the corrupter 220 may be configured to perform various corruption operations that modify some portion of the text sample 212. For example, FIG. 2B describes that the corrupter 220 may perform corruption operations that remove some portion of the text sample 212, replace some portion of the text sample 212, insert some text portion into the text sample 212, or modifying word/sentence mechanics (e.g., punctuation, and/or capitalization) of the text sample 212. An example removal operation may be removing one or more characters or some span of tokens. In FIG. 2B, the first corrupted text sample 222, 222a illustrates that the characters "ro" in "grouping" for the text sample 212 of "A paragraph is a grouping of sentences" has been removed. FIG. 2B, also illustrates an example of the corruption operation of replacement where one or more characters may be replaced or swapped with one or more other characters. In this example, a second corrupted text sample 222, 222b has swapped the character "e" for the character "a" in the word "sentences" for the text sample 212 of "A paragraph is a grouping of sentences." Similarly, the corrupter 220 has swapped the tokens of "ph" in "paragraph" with "fe" to form a third corrupted text sample 222, 222c. The corrupter 220 performs the corruption operation of inserting one or more characters to form a fourth corrupted text sample 222, 222d by inserting an extra "p" in the word "grouping." The fifth corrupted text sample 222, 222e is an example of the corrupter 220 changing a case for a character in one or more words of the text sample 212. Here, in the fifth corrupted text sample 222, 222e, the corrupter 220 changed the initial "A" to a lower case "a" and capitalized the "P" in "paragraph." The corrupter 220 may perform one or more corruption operations when generating the corrupted text sample 222. Additionally or alternatively, the corruption operations are not an exhaustive list of text sample modifications that the corrupter 220 may perform to introduce a grammatical error. In some configurations, when generating the training set 230 of training sample pairs 232, the corrupter 220 may randomly apply the various corruption operations to ensure grammatical error variation among the training set 230. For instance, each corrupted text sample 222 may be unique with respect to other corrupted text samples 222 in the training set 230.

In some implementations, such as FIG. 2C, the training process 200 also includes a segmenter 240. The segmenter 240 is configured to receive a text sample 212 and to generate a segmented sample 242 from the text sample 212. The segmented sample 242 refers to some length or portion of the text sample 212. That is, the segmented sample 242 may be a particular amount of words or sentence(s) from the text sample 212. In this respect, the segmenter 240 may function to ensure that the size of the text sample 212 that will be corrupted is compatible with the corrupter 220 and, more generally, an acceptable size for training the text-generating model 122. For instance, the text sample 212 may correspond to a paragraph of text and the segmenter 240 converts the text sample 212 into sentences such that each segmented sample 242 represents a sentence of the text sample 212. In FIG. 2C, the segmenter 240 receives a text sample 212 that is a paragraph of three sentences. With this text sample 212, the segmenter 240 generates three segmented text samples 242, 242a-c where a first segmented text sample 242a is the first of the three sentences, a second segmented text sample 242b is the second of the three sentences, and a third segmented text sample 242c is a third of the three sentences.

Figure 3:
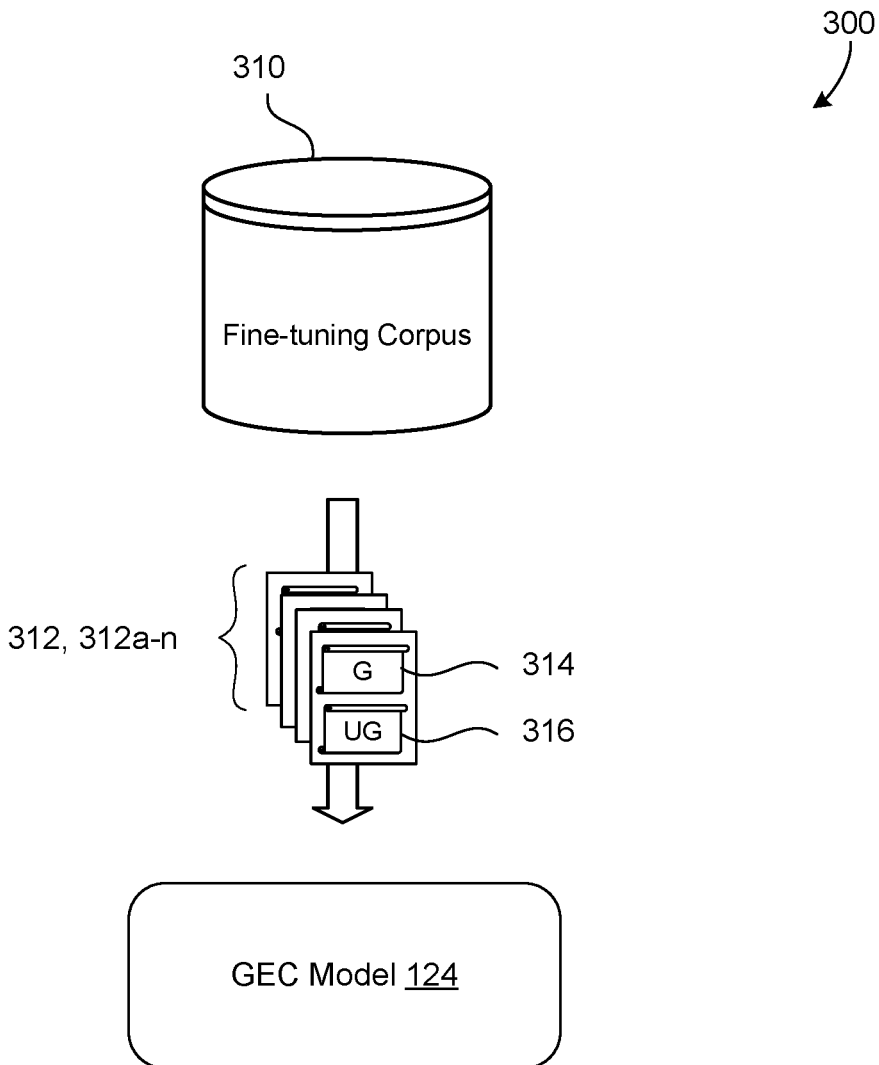
FIG. 3 is a schematic view of a fine-tuning process for the grammatical error correction model.

Referring to FIG. 3, after the training process 200 trains the text-generating model 122 to become the GEC model 124 with the training data set 230, the GEC model 124 may be further trained with a fine-tuning process 300. During the fine-tuning process 300, the fine tuning process 300 may use supervised training data. In some examples, the supervised training data corresponds to a set of non-synthetic text pairs 312, 312a-n that form a fine-tuning training corpus 310. Each fine-tuning text pair 312 includes a grammatical text sample 314 (e.g., designated in FIG. 3 with a "G") and an ungrammatical text sample 316 (e.g., designated in FIG. 3 with a "UG"). Here, the ungrammatical text sample 316 is not generated by the corrupter 220, but human-generated text. The grammatical text sample 314 refers to the grammatically correct version of the ungrammatical text sample 316 that is human-generated text such that the grammatical text sample 314 serves as labeled fine-tuning training data or supervised fine tuning training data. The fine-tuning training corpus 310 may be a multilingual corpus similar to the corpus 210 used during the training process 200. That is, each text pair 312 of the fine-tuning training corpus 310 corresponds to a monolingual grammatical-ungrammatical pair, but there are pairs 312 of different languages in the fine-tuning training corpus 310. In some example, the GEC model 124 is trained by the fine-tuning process 300 using the fine-tuning training corpus 310 until the exact match accuracy of the GEC model 124 on a development data set degrades (e.g., after 200 steps or 800 k examples or 7 epochs).

FIG. 4 is a flowchart of an example arrangement of operations for a method 400 of training a text-generating model 122 for grammatical error correction. At operation 402, the method 400 obtains a multilingual set 210 of text samples 212 where each text sample 212 includes a monolingual textual representation of a respective sentence. At operation 404, the method 400, for each text sample 212 of the multilingual set 210 of text samples 212, generates a corrupted synthetic version 222 of the respective text sample 212. The corrupted synthetic version 222 of the respective text sample 212 includes a grammatical change to the monolingual textual representation of the respective sentence associated with the respective text sample 212. At operation 406, the method 400 trains the text-generating model 122 using a training set 230 of training sample pairs 232. Each pair 232 in the training set 230 of sample pairs 232 including one of the respective text samples 212 of the multilingual set 210 of text samples 212 and the corresponding corrupted synthetic version 222 of the one of the respective text samples 212 of the multilingual set 210 of text samples 212.

Figure 5:
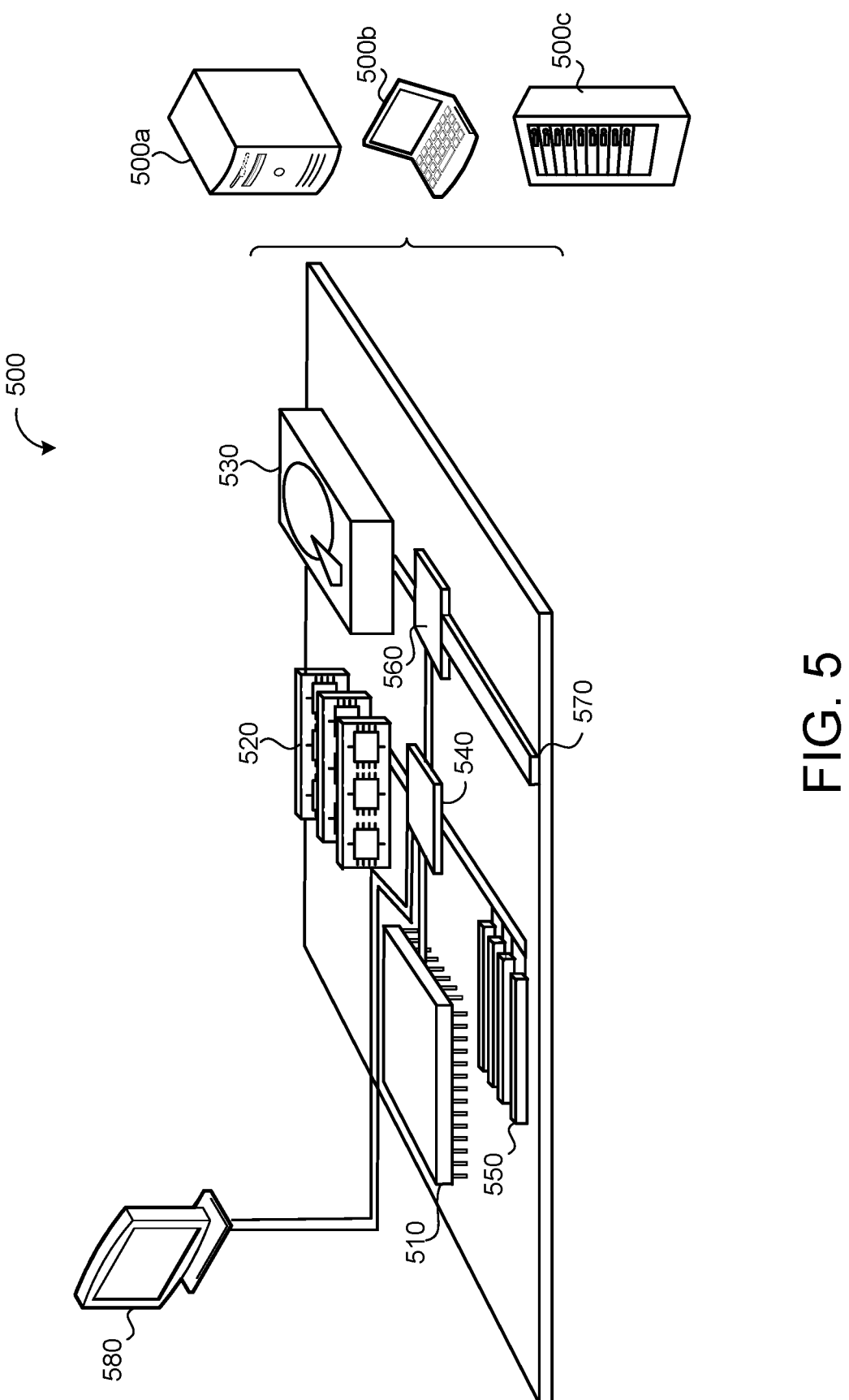
FIG. 5 is a schematic view of an example computing device that may be used to implement the systems and methods described herein.

FIG. 5 is a schematic view of an example computing device 500 that may be used to implement the systems (e.g., the NLG system 120 and/or the GEC model 124) and methods (e.g., the method 400) described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510 (e.g., data processing hardware 112, 144), memory 520 (e.g., memory hardware 114, 146), a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 570. The low-speed expansion port 570, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500*a* or multiple times in a group of such servers 500*a*, as a laptop computer 500*b*, or as part of a rack server system 500*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method of training a text-generating model for grammatical error correction (GEC), the method when executed by data processing hardware causes the data processing hardware to perform operations comprising:

obtaining a multilingual set of grammatically correct text samples, each grammatically correct text sample comprising a monolingual textual representation of a respective sentence;

for each grammatically correct text sample of the multilingual set of grammatically correct text samples, generating a corrupted synthetic ungrammatical text version of the respective grammatically correct text sample by making a grammatical change to the monolingual textual representation of the respective sentence associated with the respective grammatically correct text sample, wherein the grammatical change is made to the monolingual textual representation of the respective sentence associated with the respective grammatically correct text sample without using a dictionary that is specific to a language of the monolingual textual representation of the respective segment such that the grammatical change made to the monolingual textual representation of the respective sentence is agnostic to the language of the monolingual textual representation of the respective sentence; and training the text-generating model using a training set of sample pairs, each sample pair in the training set of sample pairs comprising:

one of the respective grammatically correct text samples of the multilingual set of grammatically correct text samples; and the corresponding corrupted synthetic ungrammatical text version of the one of the respective grammatically correct text samples of the multilingual set of grammatically correct text samples.

2. The method of claim 1, wherein the operations further comprise, after training the text-generating model, fine-tuning the trained text-generating model using supervised training data, the supervised training data comprising non-synthetic text pairs, each non-synthetic text pair comprising an ungrammatical text sample and a grammatical text version of the ungrammatical text sample.

3. The method of claim 1, wherein generating the corrupted synthetic ungrammatical text version of the respective grammatically correct text sample comprises removing more than one character from the respective sentence associated with the respective grammatically correct text sample.

4. The method of claim 1, wherein generating the corrupted synthetic ungrammatical text version of the respective grammatically correct text sample comprises replacing a first set of characters from the respective sentence associated with the respective grammatically correct text sample with a second set of characters different from the first set of characters.

5. The method of claim 1, wherein generating the corrupted synthetic ungrammatical text version of the respective grammatically correct text sample comprises inserting one or more characters into the respective sentence associated with the respective grammatically correct text sample.

6. The method of claim 1, wherein generating the corrupted synthetic ungrammatical text version of the respective grammatically correct text sample comprises changing a character-case for a character of a word of the respective sentence associated with the respective grammatically correct text sample.

7. The method of claim 1, wherein generating the corrupted synthetic ungrammatical text version of the respective grammatically correct text sample comprises randomly applying a corruption operation to the respective sentence associated with the respective grammatically correct text sample, the corruption operation comprising at least one of:

removing more than one characters from the respective sentence associated with the respective grammatically correct text sample;

replacing a first set of characters from the respective sentence associated with the respective grammatically correct text sample with a second set of characters different from the first set of characters;

inserting one or more characters into the respective sentence associated with the respective grammatically correct text sample; or changing a character-case of a word of the respective sentence associated with the respective grammatically correct text sample, wherein each corrupted synthetic ungrammatical text version is unique with respect to the other corrupted synthetic ungrammatical text versions of the text samples.

8. The method of claim 1, wherein the text-generating model comprises a transformer encoder-decoder architecture.

9. The method of claim 1, wherein the operations further comprise pre-training the text-generating model with a multilingual training corpus based on a masked-language objective.

10. The method of claim 1, wherein after training the text-generating model for GEC, the trained text-generating model is configured to:

receive, as input, a first input text in a first language that includes grammatical errors and generate, as output, a first output text in the first language that corrects the grammatical errors; and receiving, as input, a second input text in a different second language that includes grammatical errors and generate, as output from the trained text-generating model, a second output text in the second language that corrects the grammatical errors.

11. A system comprising:

data processing hardware; and memory hardware in communication with the data processing hardware, the memory hardware storing instructions that when executed on the data processing hardware cause the data processing hardware to perform operations comprising:

obtaining a multilingual set of grammatically correct text samples, each grammatically correct text sample comprising a monolingual textual representation of a respective sentence;

for each grammatically correct text sample of the multilingual set of grammatically correct text samples, generating a corrupted synthetic ungrammatical text version of the respective grammatically correct text sample by making a grammatical change to the monolingual textual representation of the respective sentence associated with the respective grammatically correct text sample, wherein the grammatical change is made to the monolingual textual representation of the respective sentence associated with the respective grammatically correct text sample without using a dictionary that is specific to a language of the monolingual textual representation of the respective segment such that the grammatical change made to the monolingual textual representation of the respective sentence is agnostic to the language of the monolingual textual representation of the respective sentence; and training the text-generating model using a training set of sample pairs, each sample pair in the training set of sample pairs comprising:

one of the respective grammatically correct text samples of the multilingual set of grammatically correct text samples; and the corresponding corrupted synthetic ungrammatical text version of the one of the respective grammatically correct text samples of the multilingual set of grammatically correct text samples.

12. The system of claim 11, wherein the operations further comprise, after training the text-generating model, fine-tuning the trained text-generating model using supervised training data, the supervised training data comprising non-synthetic text pairs, each non-synthetic text pair comprising an ungrammatical text sample and a grammatical text version of the ungrammatical text sample.

13. The system of claim 11, wherein generating the corrupted synthetic ungrammatical text version of the respective grammatically correct text sample comprises removing more than one characters from the respective sentence associated with the respective grammatically correct text sample.

14. The system of claim 11, wherein generating the corrupted synthetic ungrammatical text version of the respective grammatically correct text sample comprises replacing a first set of characters from the respective sentence associated with the respective grammatically correct text sample with a second set of characters different from the first set of characters.

15. The system of claim 11, wherein generating the corrupted synthetic ungrammatical text version of the respective grammatically correct text sample comprises inserting one or more characters into the respective sentence associated with the respective grammatically correct text sample.

16. The system of claim 11, wherein generating the corrupted synthetic ungrammatical text version of the respective grammatically correct text sample comprises changing a character-case for a character of a word of the respective sentence associated with the respective grammatically correct text sample.

17. The system of claim 11, wherein generating the corrupted synthetic ungrammatical text version of the respective grammatically correct text sample comprises randomly applying a corruption operation to the respective sentence associated with the respective grammatically correct text sample, the corruption operation comprising at least one of:

removing more than one characters from the respective sentence associated with the respective grammatically correct text sample;

replacing a first set of characters from the respective sentence associated with the respective grammatically correct text sample with a second set of characters different from the first set of characters;

inserting one or more characters into the respective sentence associated with the respective grammatically correct text sample; or changing a character-case of a word of the respective sentence associated with the respective grammatically correct text sample, wherein each corrupted synthetic ungrammatical text version is unique with respect to the other corrupted synthetic ungrammatical text versions of the text samples.

18. The system of claim 11, wherein the text-generating model comprises a transformer encoder-decoder architecture.

19. The system of claim 11, wherein the operations further comprise pre-training the text-generating model with a multilingual training corpus based on a masked-language objective.

20. The system of claim 11, wherein after training the text-generating model for GEC, the trained text-generating model is configured to:

receive, as input, a first input text in a first language that includes grammatical errors and generate, as output, a first output text in the first language that corrects the grammatical errors; and receiving, as input, a second input text in a different second language that includes grammatical errors and generate, as output from the trained text-generating model, a second output text in the second language that corrects the grammatical errors.

* * * * *